United States Patent [19]
Banks

[11] Patent Number: 5,634,656
[45] Date of Patent: Jun. 3, 1997

[54] AXLE ALIGNMENT ASSEMBLY

[75] Inventor: Raymond L. Banks, Double Springs, Ala.

[73] Assignee: Econoline Trailers, Inc., Double Springs, Ala.

[21] Appl. No.: 555,610

[22] Filed: Nov. 9, 1995

[51] Int. Cl.⁶ .................................................. B60G 11/02
[52] U.S. Cl. .............................................. 280/718; 267/52
[58] Field of Search ................................ 280/718, 680, 280/686, 661, 669; 267/52

[56] References Cited

U.S. PATENT DOCUMENTS

| | | | |
|---|---|---|---|
| 2,745,661 | 5/1956 | Van Raden | 267/52 |
| 3,144,246 | 8/1964 | Hamlet | 267/52 |
| 3,194,580 | 7/1965 | Hamlet | 280/718 |
| 3,913,937 | 10/1975 | Longworth et al. | 280/680 |
| 4,281,851 | 8/1981 | Brandt | 280/669 |
| 5,046,756 | 9/1991 | Hertrick | 280/718 |
| 5,401,054 | 3/1995 | Phillips | 280/718 |

*Primary Examiner*—Paul N. Dickson
*Attorney, Agent, or Firm*—Veal & Associates

[57] ABSTRACT

An assembly for aligning an axle in relation to a leaf spring assembly. The traditional integral axle perch has been replaced by a stationary support plate, positioned on top of the leaf spring assembly in the usual manner, and a separate axle cradle, pivotally mounted on top of the support plate to permit adjustment of the alignment of the axle.

8 Claims, 4 Drawing Sheets

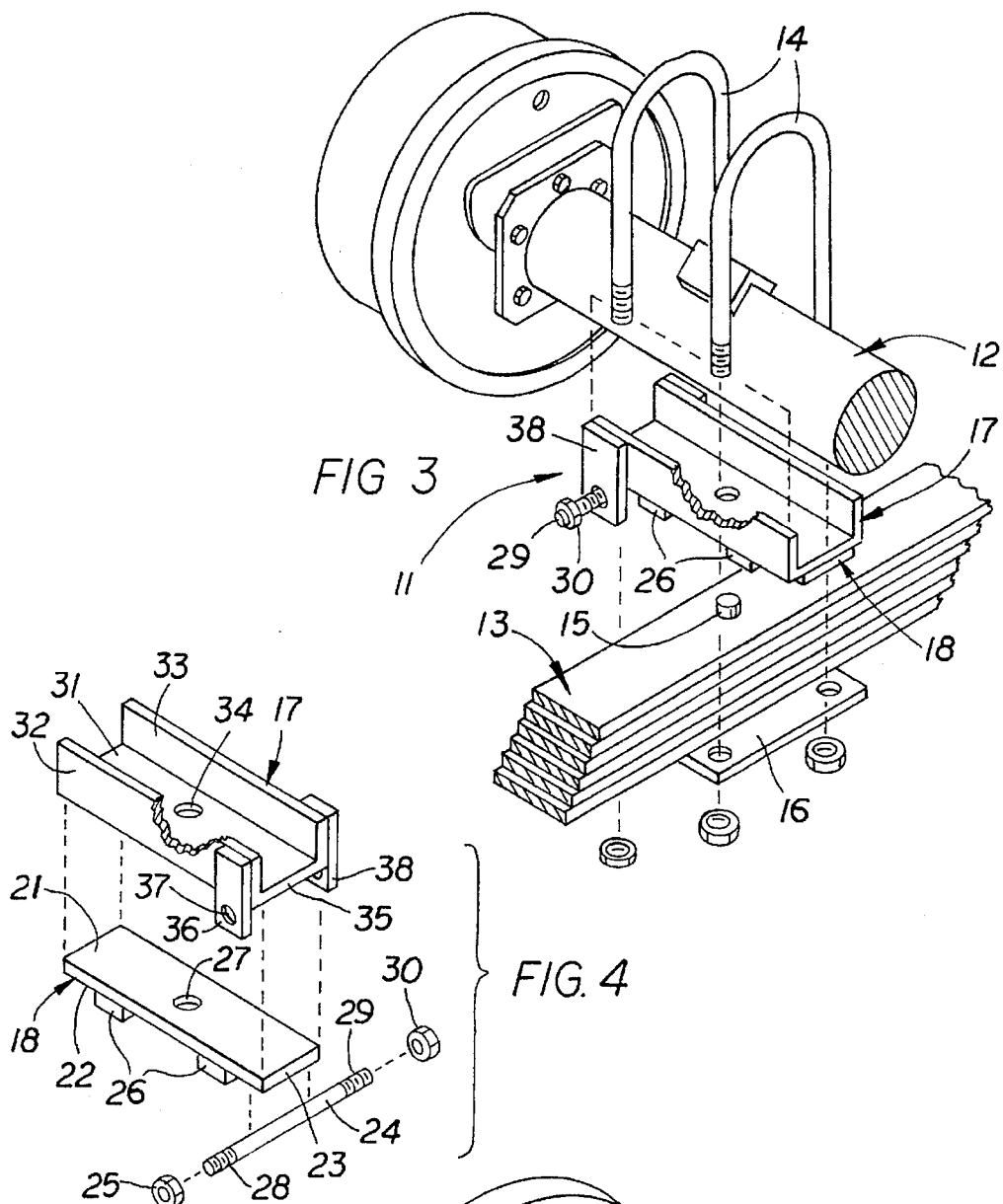
FIG 3
FIG. 4
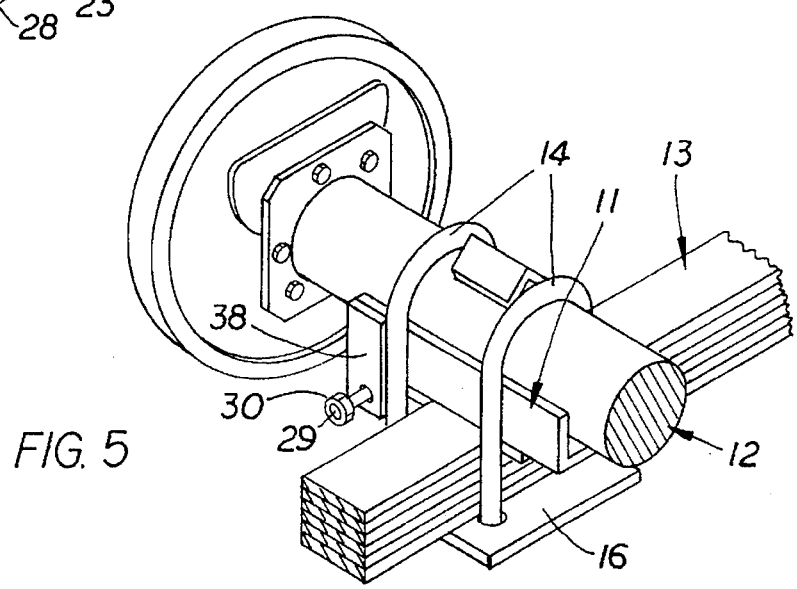
FIG. 5

5,634,656

1

AXLE ALIGNMENT ASSEMBLY

FIELD OF THE INVENTION

The present invention relates to trailer axles. More particularly, the present invention relates to an adjustable device for aligning trailer axles.

BACKGROUND OF THE INVENTION

As in the case of motor vehicles, improper alignment of the wheels of a trailer can cause extraordinary wear on the trailer tires. The excessive wear is caused by the tendency of the trailer to pull to the left or right as the trailer is towed forward.

Presently, trailer axles are mounted to the leaf springs of the trailer using an axle perch, as shown in FIG. 1. The perch is an elongated cradle, having an aperture through the center of the bottom plate, and positioning flanges depending from its lower surface. The perch is placed on top of a leaf spring assembly, with the positioning flanges extending downwardly on opposite sides of the leaf spring assembly. The positioning flanges are rigidly affixed to the lower surface of the cradle, and are positioned to fit adjacent the sides of the leaf spring assembly. The pin that aligns the multiple leaves of the leaf spring assembly extends upwardly through the uppermost leaf, and into the aperture in the bottom of the cradle. The trailer axle is placed into the perch and welded into place. The axle and perch are fastened to the leaf spring assembly using a pair of U-bolts and a tie plate. The design of the axle perch presently used does not permit adjustment of the axis of the axle for proper alignment.

SUMMARY OF THE INVENTION

With the foregoing in mind, the principal object of the present invention is to provide an apparatus for aligning trailer axles.

Another object of the present invention is to provide an apparatus for aligning trailer axles which is adjustable.

Yet another object of the invention is to provide an adjustable apparatus for aligning trailer axles which is easy to operate.

Another object of the invention is to provide an adjustable apparatus for aligning trailer axles which is inexpensive to manufacture.

These and other objects of the present invention are accomplished through the use of an axle alignment assembly in which the traditional axle perch has been replaced by a stationary support plate, positioned on top of the leaf spring assembly in the usual manner, and a separate axle cradle, pivotally mounted on top of the support plate to permit adjustment of the alignment of the axle.

BRIEF DESCRIPTION OF THE DRAWINGS

The foregoing objects and advantages of the present invention for an axle alignment assembly will be more readily understood by one skilled in the art by referring to the following detailed description of the invention and to the accompanying drawings which form a part of this disclosure, and wherein:

FIG. 3 is an exploded perspective view of the axle alignment assembly, showing its position relative to the leaf spring assembly and the axle;

2

Figure 6:
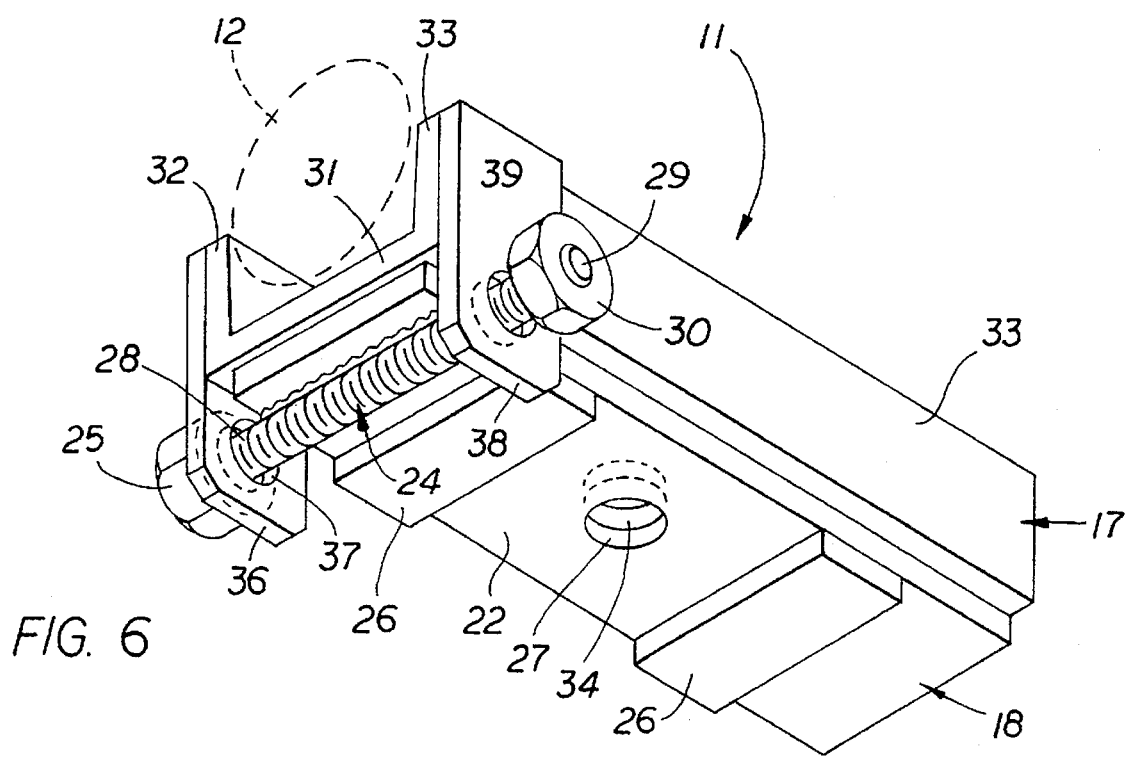

FIG. 4 is an exploded perspective view of the axle alignment assembly;

FIG. 5 is a perspective view showing the axle, axle alignment assembly and leaf spring assembly as assembled;

FIG. 6 is a bottom perspective view of the axle alignment assembly; and

Figure 7:
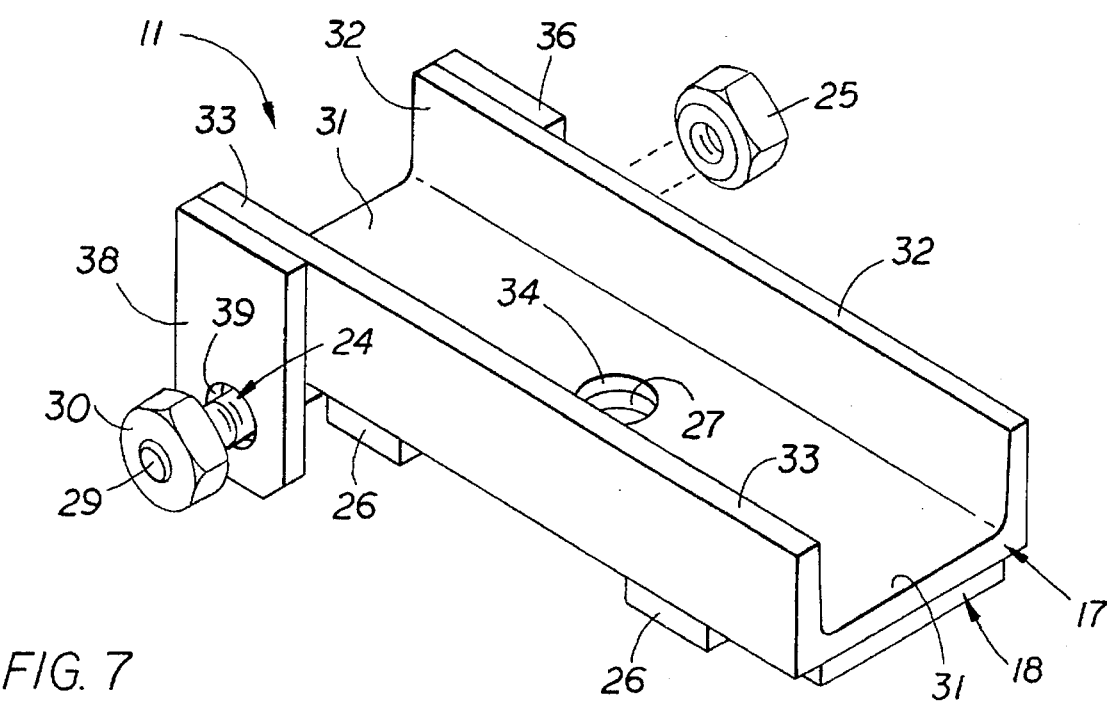

FIG. 7 is a perspective view of the axle alignment assembly.

DETAILED DESCRIPTION OF THE INVENTION

Figure 1:
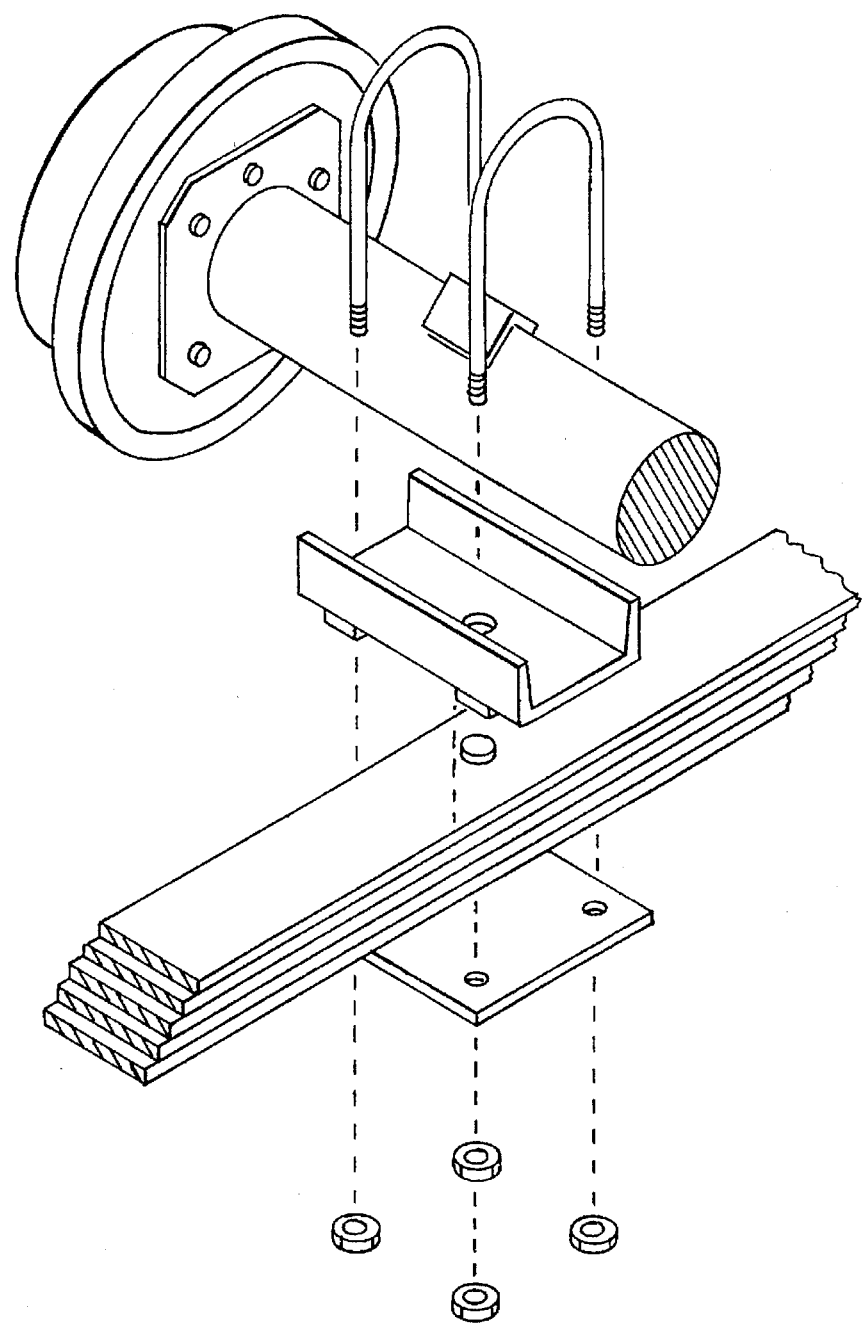
FIG. 1 is an exploded perspective view of the prior art, showing the use of an axle perch.
Figure 2:
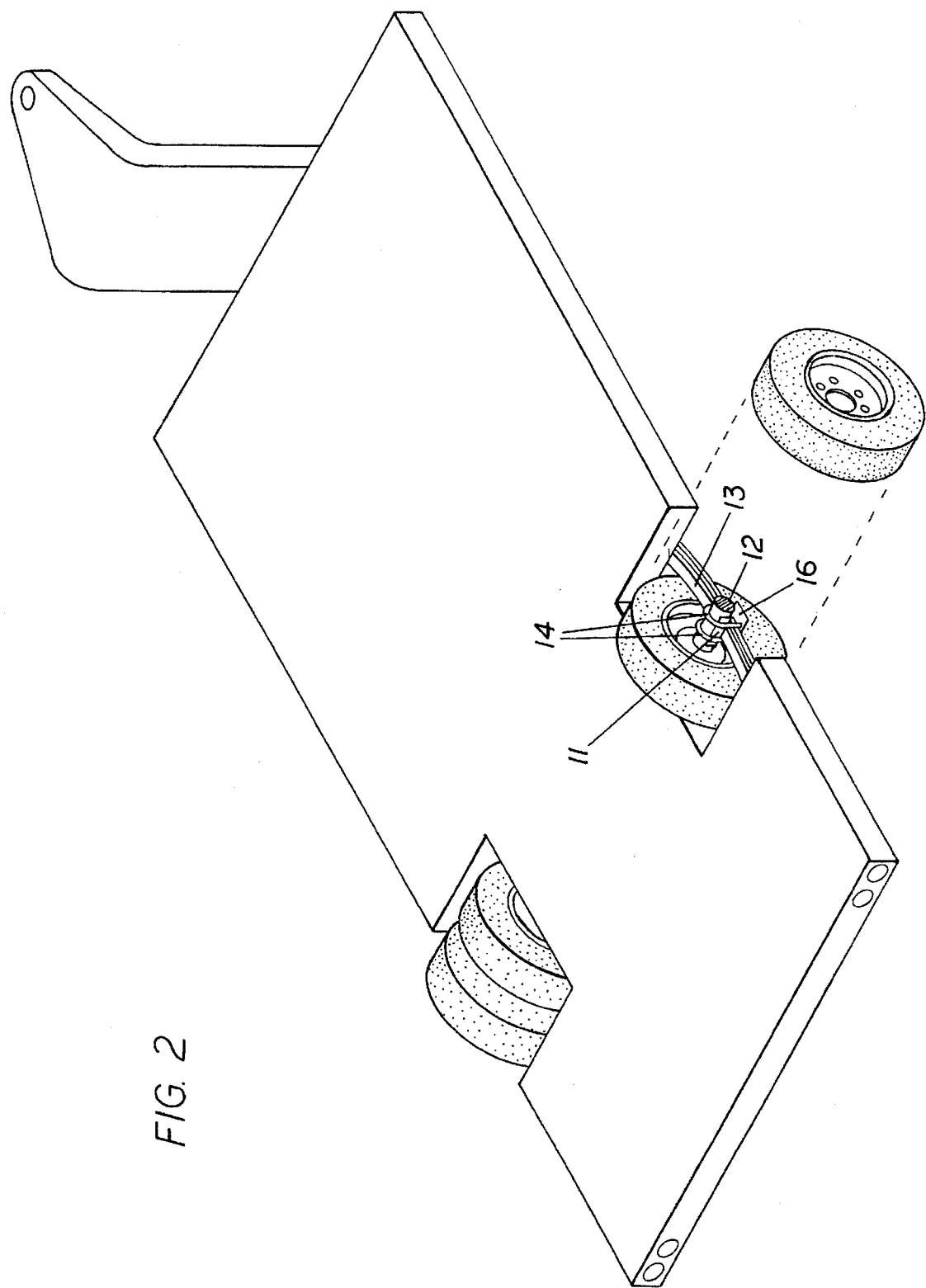
FIG. 2 is a perspective view of a trailer of the type used with the present invention with parts broken away to show the location of the axle.

The axle alignment assembly of the present invention is particularly well-suited for use with the bogie axles used in low-boy trailers as shown in FIG. 2. As shown in FIG. 3, the axle alignment assembly 11 is positioned between the axle 12 and the leaf spring assembly 13. The axle 12, axle alignment assembly 11 and leaf spring assembly 13 are secured by a pair of U-bolts 14 and a tie plate 16. The multiple leaves of the leaf spring assembly 13 are held in alignment by an alignment pin 15. As best shown in FIG. 4, the axle alignment assembly 11 includes a three-sided axle cradle 17 which is placed on top of a support plate 18. The support plate 18 has an upper surface 21, a lower surface 22 and an adjustment end 23. A threaded stud 24 is welded to the lower surface 22 of the support plate 18 at the adjustment end 23. The threaded stud 24 has a forward end 28 and a rear end 29. A forward nut 25 is threadably engaged with the forward end 28 of the threaded stud 24, and a rear nut 30 is threadably engaged with the rear end 29 of the threaded stud 24. Two positioning flanges 26 depend from the lower surface 22 of the support plate 18. The flanges 26 are spaced so that they fit adjacent opposing sides of the leaf spring assembly 13. An aperture 27 in the center of the support plate 18 is dimensioned to receive the upper end of the alignment pin 15 when the support plate 18 is placed on the leaf spring assembly 13.

The axle cradle 17 forms a channel for receiving the axle 12. The cradle 17 has a bottom plate 31, a forward wall 32, a rear wall 33 and an adjustment end 35. The bottom plate 31 has an aperture 34 through its center for receiving the upper end of the alignment pin 15. A forward arm 36 is affixed to the forward wall 32 proximal the adjustment end 35 of the cradle 17, and extends below the bottom plate 31. The forward arm 36 has an aperture 37 for receiving the forward end 28 of the threaded stud 24. A rear arm 38 is affixed to the rear wall 33 proximal the adjustment end 35 of the cradle 17, and likewise extends below the bottom plate 31 of the cradle 17. The rear arm 38 has an aperture 39 for receiving the rear end 29 of the threaded stud 24 (See FIG. 7).

When assembled, the cradle 17 is supported on the upper surface 21 of the support plate 18, with the upper end of the alignment pin 15 extending through apertures 27 and 34 (See FIGS. 3 and 6). While the support plate 18 is substantially stationary with respect to the leaf spring assembly 13, the cradle 17 is pivotable about the alignment pin 15 within a limited range of motion. The threaded stud 24 extends through the apertures 37 and 39 in the forward arm 36 and rear arm 38, and is welded into position on the lower surface 22 of the support plate 18 at the adjustment end 23. The forward nut 25 and the rear nut 30 limit the movement of the cradle 17 by providing stops for the forward arm 36 and the rear arm 38.

To adjust the axle 12, the forward nut 25 and rear nut 30 are adjusted to position the axle cradle 17. If, for example, it is desired to turn the axle 12 toward the centerline of the road, and the axle alignment assembly is installed with the adjustment end 35 of the cradle 17 toward the left of the axle, the rear nut 30 would be loosened, and the forward nut 25 tightened, causing the cradle 17 to rotate slightly in a counterclockwise direction about the alignment pin 15. To turn the axle 12 toward the right side of the road, the rear nut 30 would be tightened, and the forward nut 25 loosened, causing the cradle 17 to rotate slightly in a clockwise direction.

While I have shown my invention in a single embodiment, it will be obvious to those skilled in the art that the invention is not so limited, but is susceptible of various changes and modifications without departing from the spirit thereof. For instance, although I have depicted my invention as used with a bogie axle, it may likewise be used to mount a continuous axle which extends the width of the trailer.

Having set forth the nature of the invention, what I claim is:

1. An apparatus for aligning an axle relative to a leaf spring assembly, wherein said leaf spring assembly has a plurality of leaves, including an uppermost leaf, and an alignment pin extending through said plurality of leaves, said alignment pin having an upper end protruding from said uppermost leaf and engaging said axle, said apparatus comprising:

(a) means, positionable along an axis relative to said leaf spring assembly, for holding said axle along said axis;

(b) means for selectively adjusting the position of said holding means, thereby adjusting the position of said axis relative to said leaf spring assembly comprising a support plate, mountable in fixed relation to said uppermost leaf spring and mounted in variable angular relation to said means for holding, having an aperture therethrough for receiving said upper end of said alignment pin and a lower surface for extending transversely of said uppermost leaf spring; a threaded stud, rigidly affixed along a lateral edge and to said lower surface of said support plate so as to be lateral of said uppermost leaf spring, said stud having a forward end and a rear end extending outwardly from said support plate, said stud engaging said means for holding such that the angular relation of said means for holding and said support plate are selectively adjustable; and (c) means for securing said axle to said leaf spring assembly.

2. An apparatus for aligning an axle relative to a leaf spring assembly, wherein said leaf spring assembly has a plurality of leaves, including an uppermost leaf, and an alignment pin extending through said plurality of leaves, said alignment pin having an upper end protruding from said uppermost leaf, said apparatus comprising:

(a) means, positionable along an axis relative to said leaf spring assembly, for holding said axle along said axis;

(b) means for selectively adjusting the position of said holding means, thereby adjusting the position of said axis relative to said leaf spring assembly comprising a support plate, having an aperture therethrough for receiving said upper end of said alignment pin, said support plate further having an upper surface, a lower surface and an adjustment end; a threaded stud, rigidly affixed to said lower surface of said support plate proximal said adjustment end of said support plate, said stud having a forward end and a rear end extending outwardly from said support plate; and means for positioning said support plate in a predetermined position relative to said leaf spring assembly wherein said support plate positioning means comprises first and second flanges depending from said lower surface of said support plate, said first and second flanges positioned such that said uppermost leaf spring is intermediate said first and second flanges; and (c) means for securing said axle to said leaf spring assembly.

3. An apparatus for aligning an axle relative to a leaf spring assembly wherein said leaf spring assembly has a plurality of leaves, including an uppermost leaf, and an alignment pin extending through said plurality of leaves, said alignment pin having an upper end protruding from said uppermost leaf, said apparatus comprising:

(a) means, positionable along an axis relative to said leaf spring assembly, for holding said axle along said axis;

(b) means for selectively adjusting the position of said holding means, thereby adjusting the position of said axis relative to said leaf spring assembly wherein said adjusting means comprises a support plate, having an aperture therethrough for receiving said upper end of said alignment pin, said support plate further having an upper surface, a lower surface and an adjustment end; a threaded stud, rigidly affixed to said lower surface of said support plate proximal said adjustment end of said support plate, said stud having a forward end and a rear end extending outwardly from said support plate; and means for positioning said support plate in a predetermined position relative to said leaf spring assembly; and (c) means for securing said axle to said leaf spring assembly, wherein said axle holding means comprises:

a cradle positioned on said upper surface of said support plate, said cradle having a bottom plate and first and second sides extending upwardly from said bottom plate, said bottom plate having an aperture defined therethrough for receiving said upper end of said alignment pin;

a forward arm, affixed to and depending from said first side of said cradle, said forward arm having an aperture therethrough for receiving said forward end of said threaded stud; and a rear arm, affixed to and depending from said second side of said cradle, said rear arm having an aperture therethrough for receiving said rear end of said threaded stud.

4. An apparatus for aligning a trailer axle in a proper position relative to a leaf spring assembly, said axle and said leaf spring assembly each having a longitudinal axis, wherein said leaf spring assembly comprises a plurality of leaves and an alignment pin extending therethrough, said apparatus comprising:

(a) means, positionable intermediate said axle and said leaf spring assembly, for selectively varying the angle between said longitudinal axis of said axle and said longitudinal axis of said leaf spring assembly, wherein said angle varying means comprises an elongated member having a bottom, a forward wall extending upwardly from said bottom, and a rear wall extending upwardly from said bottom, said forward wall, said rear wall and said bottom defining an upwardly opening channel for receiving said axle, said bottom having an aperture therethrough for receiving said alignment pin, said elongated member being pivotally mounted on said alignment pin;

(b) means, for being stationary with respect to said leaf spring assembly, and for positioning said angle varying means along said longitudinal axis of said leaf spring assembly wherein said positioning means comprises a support plate positionable intermediate said leaf spring assembly and said angle varying means, said support plate having an upper surface, a lower surface and an aperture defined therethrough for receiving said alignment pin, said support plate further having first and second positioning flanges depending from said lower surface, said first and second positioning flanges extendable downwardly adjacent to and on opposing sides of said leaf spring assembly; and (c) means for securing said axle in said proper position relative to said leaf spring assembly.

5. An apparatus as defined in claim 4, wherein said support plate further has an adjustment end, a forward edge, and a rear edge, and wherein said positioning means further comprises a threaded stud, rigidly at fixed to said lower surface of said support plate proximal said adjustment end, said threaded stud having a forward end extending beyond said forward edge of said support plate and a rear end extending beyond said rear edge of said support plate.

6. An apparatus as defined in claim 5, wherein said elongated member further has an adjustment end and wherein said angle varying means further comprises:

(a) a forward arm extending downwardly from said adjustment end of said elongated member proximate said forward wall, said forward arm having an aperture therethrough for receiving said forward end of said threaded stud;

(b) a rear arm extending downwardly from said adjustment end of said elongated member proximal said rear wall, said rear arm having an aperture therethrough for receiving said rear end of said threaded stud;

and wherein said elongated member is positioned on said upper surface of said support plate such that said adjustment end of said support plate is intermediate said forward arm and said rear arm and such that said forward end of said threaded stud extends through said aperture in said forward arm and said rear end of said threaded stud extends through said aperture in said rear arm.

7. An apparatus as defined in claim 6, further comprising a forward nut, threadably engaged with said forward end of said threaded stud externally of said forward arm, and a rear nut, threadably engaged with said rear end of said threaded stud externally of said rear arm.

8. In a bogie for supporting a low body trailer, comprising an axle connecting tandem wheels, a leaf spring assembly connected to a frame of said bogie and said axle, and an alignment pin extending through said leaf spring assembly into said axle, the improvement comprising:

a support plate mounted superjacent an uppermost leaf spring of said leaf spring assembly, including means for maintaining said support plate in transverse alignment with said leaf spring assembly;

an upwardly opening axle cradle, mounted superjacent said support plate and adapted to receive said axle in longitudinal alignment therewith, having an aperture therethough for receiving said alignment pin and a pair of depending flanges extending on either side of said support plate;

a elongated threaded member affixed to said support plate and extending through said depending flanges for engagement with threaded adjustment nuts, such that selective engagement of said adjustment nuts with said threaded member varies the alignment of said cradle and axle relative to said support plate by pivoting said cradle and axle about a vertical axis coincident with said alignment pin.

* * * * *